Patented Mar. 16, 1937

2,074,288

UNITED STATES PATENT OFFICE 2,074,288

FLUORESCENT HYDROCARBON OILS

John M. Tinker, South Milwaukee, and Viktor M. Weinmayr, Milwaukee, Wis., assignors to E. I. du Pont de Nemours & Company, Wilmington, Del., a corporation of Delaware No Drawing. Application November 21, 1934, Serial No. 754,086

8 Claims. (Cl. 87—9)

This invention relates to the coloring of hydrocarbon oils and other hydrocarbon type solvents with color bodies which impart thereto a strong fluorescence.

In the distillation of many petroleum hydrocarbons for the preparation of the various fractions now in commercial use, from the light naphthas to the heavy lubricating oils, and in the chemical treatment of such fractions, where it is employed, part of and in some cases substantially all of the natural fluorescence of the oils is either removed or destroyed. Fluorescence, particularly in lubricating oils, is desirable for it tends to mask the black discoloration which results from its use, particularly in internal combustion engines. Lubricating oils which have this bloom, or fluorescence, are therefore preferred by the trade over the non-fluorescent oils.

It is the object of the present invention to produce fluorescent hydrocarbon oils and other solvents in which the fluorescence is stable under the ordinary conditions of use.

It is a further object of this invention to provide a class of color compounds which, when dissolved in hydrocarbon oils or other hydrocarbon type solvents, imparts thereto a fluorescence ranging from blue-green to orange and red shades, making possible by mixing those compounds which impart thereto blue-green or red shades a variety of colors, so that those manufacturing and selling oils and solvents may impart to their products any desired shade of fluorescence, as a means for identification.

We have found that when polynuclear aromatic ketones of the anthraquinone series, such as anthraquinone, benzanthrone an anthanthrone, or their methyl or halogen derivatives, or mixtures of one or more of these compounds, are heated to temperatures above about 280° C., with a reducing metal, for example, iron, zinc, tin, nickel, lead, etc., and if desired in the presence of high boiling solvents, color compounds are produced which when dissolved in oils or other hydrocarbon type solvents impart thereto a strong fluorescence ranging from blue-green to orange and red shades.

The formation of these color bodies begins at temperatures of around 280° C., with optimum results being obtained at temperatures between 300 and 360° C., the upper limit being fixed by the temperature at which decomposition of the compound takes place under the particular conditions used. These color bodies are new chemical compounds and are covered by applicants' copending application Serial No. 754,085 filed November 21, 1934.

We have found that high boiling solvents may also be employed in the reaction and that the solvents and the particular temperature at which the reaction is carried out modify to some extent the shade of the resulting product. Those high boiling solvents which boil above 280° C. in general are suitable so long as they do not enter into the reaction to materially alter the formation of the desired color compound. High boiling compounds such as benzophenone, abietane, abietene, benzol-2-benzoic acid and the chloro- and/or methyl-substituted benzoyl - 2 - benzoic acids have been found to operate satisfactorily as solvents in this reaction. The benzoyl-benzoic acid compounds are, in part at least, converted to benzophenone under the conditions of this reaction, but this conversion does not appear to have an appreciable effect on the preparation of the color compound, so far as we can determine. A slight change in shades of the products obtained when various solvents are used is believed to be the result of the physical conditions of the reaction and not due to any combination of the solvent with the anthraquinone body. The reaction may also be carried out with lower boiling solvents where elevated pressure is used.

Any of the metals which under the conditions of the reaction will effect a reduction of the anthraquinone compounds may be employed, such as zinc, iron, nickel, tin, lead, etc.; and for convenience these metals will be referred to as reducing metals.

The following examples are given to more fully illustrate our invention. The parts used are by weight.

Example 1

100 parts of benzanthrone are melted and heated to 250° C. 80 parts of iron powder are added to the benzanthrone at this temperature under agitation. The mass is now slowly heated to 300–350° C. and held there for 20 hours. The black reaction mass is poured onto pans to cool and milled fine after cooling. It is extracted with hot benzene in which the color compound is soluble with a yellow brown color. 90 parts of a light brown powder are obtained when the benzene is distilled off or removed with steam. This product imparts to hydrocarbon oils a strong green fluorescence when added in small amounts. A crude benzanthrone, containing large amounts of solvent insoluble material, can be used in place of a more pure benzanthrone without affecting the characteristic fluorescence of the resulting compound.

Example 2

120 parts of benzanthrone are heated to about 250° with 80 parts of benzophenone, and 100 parts of iron powder are added at this temperature. The mass is then heated to the reflux temperature of the benzophenone and held there for about 20 hours. Some of the benzophenone may be recovered by raising the temperature above its boiling point. The recovered benzophenone may be used for subsequent preparation without further purification. The resulting compound may be isolated by the method described in Example 1, or the mass can be cooled almost to its melting point and a high boiling solvent, such as dichlorobenzene or trichlorobenzene, can be added. The green bloom producing agent dissolved in these solvents is then isolated by distilling off the solvent. The product shows a light green fluorescence in hydrocarbon oils.

Example 3

150 parts of benzanthrone, 50 parts of benzoyl-2-benzoic acid, and 100 parts of abietene are heated to 230° C. 100 parts of tin are added while the temperature is slowly raised to 320–340°. The fluorescent product formed, which is of a slightly more olive shade than the products of the previous examples, can be isolated by any of the methods described in previous examples.

Abietane may be used in place of abietene and substituted benzoyl-2-benzoic acids, such as the methyl or chloro substituted benzoyl-2-benzoic acids, may be employed.

Example 4

750 parts of benzanthrone and 250 parts of benzoyl-2-benzoic acid are heated to about 250° C. and 650 parts of iron powder are slowly added at this temperature. The mixture is then heated to 320–330° C. for about 24 hours. Some dark colored oil formed during the reaction may be distilled off. The charge is worked up as described in the previous examples. The compound, which imparts to liquid hydrocarbons a strong green fluorescence, is very soluble in organic solvents, such as benzene, gasoline, kerosene, paraffin oil, pyridine, and others, showing bright green fluorescence in dilute solutions. It is sparingly soluble in alcohol, acetic acid, and acetic anhydride. The product, when isolated as described above, has a melting point of about 198–210° C. A combustion shows it contains 94.65% carbon and 5.3% hydrogen. It has a melting point of 239–249° C. after two crystallizations from pyridine, and analyzes 95.3% carbon and 4.26% hydrogen. The purified product has the same fluorescence as the crude product. It is soluble in cold sulfuric acid with blue color and red fluorescence. It can easily be oxidized to vat dyes. Compounds with similar green fluorescence can be obtained from other benzanthrones, and other benzoyl-2-benzoic acids may be used as the solvents, as illustrated by the following examples.

Example 5

75 parts of 2-methyl-benzanthrone and 40 parts of iron powder are heated to 300° C. for several hours. A product which exhibits yellow-green fluorescence in solvents and hydrocarbon oils is obtained by extracting the crude fusion mass obtained.

Example 6

50 parts of Bzl-chloro-benzanthrone, 20 parts of benzoyl-2-benzoic acid, and 40 parts of iron are heated to 310° C. for a few hours. A product showing a yellow-green bloom in solvents and hydrocarbon oils can be isolated in the manner above described.

Example 7

150 parts of benzanthrone, 50 parts of alpha-naphthoyl-2-benzoic acid and 75 parts of iron powder are heated to 300–330° C. for 24 hours. The finished reaction mass is cooled to about 200° C. and ortho-dichlorobenzene is added to it. The whole is then extracted with dichlorobenzene and the product is isolated by steam distilling off the solvent. A product exhibiting a yellow-green fluorescence in solvents and hydrocarbon oils is obtained with good yield.

Products showing a similar fluorescence are formed when benzanthrone and iron powder are heated with 4'-methyl- or 4'-chloro-benzoyl-2-benzoic acid or mixtures thereof.

Example 8

225 parts of benzanthrone and 75 parts of benzoyl-2-benzoic acid are heated with 195 parts of zinc dust to 310° C. for 17 hours. The crude product is extracted and a product which exhibits a yellow-green fluorescence in solvents is obtained.

Example 9

20 parts of 1,1'-dianthraquinonyl, 40 parts of benzoyl-2-benzoic acid, 40 parts of benzophenone and 20 parts of iron powder are heated to 310–320° for 20 hours. A product which exhibits an olive-green fluorescence in solvents and hydrocarbon oils is obtained by the usual extraction.

Example 10

1000 parts of anthraquinone, 250 parts of benzoyl-2-benzoic acid, and 100 parts of benzophenone are heated to 260° C. and 600 parts of iron powder are added slowly at this temperature. The temperature is then raised to 310° and maintained there for about 18 hours. The dark reaction product is poured onto pans and milled after cooling. The red fluorescent compound is separated from the iron residue by extraction with hot solvent naphtha and isolated by steam distilling off the solvent. 662 parts of dry product are obtained. This compound shows a strong red fluorescence when added to organic solvents or hydrocarbon oils in small amounts.

A product showing a similar, but much weaker fluorescence, is obtained when anthraquinone alone is heated with iron powder to 300–360° C.

Example 11

Equal parts of benzanthrone, anthraquinone, benzophenone and iron powder are heated to 305–310° C. for about 22 hours. The black reaction product is discharged into pans, allowed to cool, and milled fine. The fluorescent compound is extracted from the iron residue with hot toluene or solvent naphtha. The solvent is removed by steam distillation and 0.9 part of the combined weight of benzanthrone and anthraquinone are obtained as a reddish brown powder, which shows a yellow-red fluorescence in dilute solutions in organic solvents and hydrocarbon oils. The melting point of the product as obtained is about 140–208° C. It contains 86.33% carbon, 5% hydrogen and 8.67% oxygen. It contains some unchanged anthraquinone which does not affect its use as a bloom producing agent for hydrocarbon oils. The solution in sulfuric acid is yellow-brown with a strong yellow fluorescence.

*Example 12*

135 parts of benzanthrone, 60 parts of benzoyl-2-benzoic acid, 5 parts of anthraquinone and 100 parts of iron powder are heated to 300–310° C. for 17 hours. Chlorobenzene is added to the finished fusion at about 160° C. and the bloom agent is extracted. The product shows on olive green fluorescence in solvents and hydrocarbon oils.

*Example 13*

200 parts of benzanthrone, 60 parts of 1,4-dihydroxy-anthraquinone and 100 parts of iron powder are heated to 330° C. for 22 hours. A product with a yellow green bloom is obtained by extraction.

*Example 14*

Equal parts of benzanthrone, 2-chloro-anthraquinone and iron are heated in the presence of small amounts of benzophenone to 310° for several hours. A product which exhibits a yellow red fluorescence in solvents and oils is obtained by the usual method of isolation.

*Example 15*

150 parts of anthraquinone, 100 parts of abietene, and 50 parts of benzanthrone are heated to 340° for 24 hours in the presence of 100 parts of iron powder. A very good yield of a product showing an olive green fluorescence in hydrocarbons is obtained. Similar compounds or compounds showing a slightly redder fluorescence are obtained when benzanthrone, 4'-chloro-benzoyl-2-benzoic acid and iron powder or anthraquinone and iron powder are heated with abietene or with abietane.

*Example 16*

100 parts of benzanthrone, 100 parts of anthraquinone and 100 parts of tin are heated to 310–320° C. in the presence of 50 parts of benzophenone. A compound with a yellow red fluorescence in solvents and oils is obtained by extraction of the crude.

*Example 17*

Equal parts of benzanthrone, anthraquinone and zinc dust are heated to 310° for 20 hours, in the presence of some benzophenone. A compound showing the same yellow red fluorescence in solvents is formed as when iron powder instead of zinc dust was used.

*Example 18*

Compounds giving a yellow red to bluish red bloom to hydrocarbons are also formed when benzanthrone and anthanthrone, anthanthrone and benzoyl-2-benzoic acid or pyrazolanthrone and benzoyl-2-benzoic acid are heated with reducing metals in the manner described in the preceding examples.

The formation of these compounds becomes noticeable during the first hour of heating at temperatures above 290° C. with optimum results being obtained during the first 24 hours. The amount of metal used, we have found, influences to some extent the shade of the bloom which is ultimately obtained from the color compound when dissolved in oil; too small amounts of the metal give dull shades. The time required to complete the reaction is also materially increased when too small an amount of metal is used.

Numerous variations in the processes above described may be made without departing from our invention. The starting materials need not be chemically pure or even technically pure, and mixtures of the compounds mentioned or their isomers may be used. The compounds may be intimately mixed together before heating is commenced, or they may be charged in one after the other at any temperature found to be convenient. Numerous modifications may also be made in the particular methods for isolating the color compounds. High boiling solvents may be added to the molten mass and thus avoid milling of the crude product, or continuous extraction may be employed. Alternatively, the iron or other metal may be removed by digesting the crude fusion product with dilute acids, such as hydrochloric or sulfuric, the water soluble salts being removed with the solution by filtration.

Analysis of the resulting color compounds indicates that reduction takes place to a greater or lesser degree together with condensation of one or more molecules of the polynuclear ketones of the anthraquinone series.

The amounts of our bloom producing color bodies to be added to oils will vary, depending naturally upon the amount of bloom desired and the particular kind of bloom which the oil treated may already possess. Usually the amount of the color body to be added is less than .06%. These fluorescent producing color bodies may be used for producing a bloom in oils which have no color or fluorescence as well as with oils which have a fluorescence only in a small degree or for altering the particular shade of the fluorescence which the oil naturally exhibits.

By using small amounts of the green or the red bloom producing color bodies, various shades may be produced. The color bodies or mixtures may be added directly to the warm oils or strong solutions of the colors prepared in suitable organic solvents can be used for adding to hydrocarbon oils. It may also be found desirable in the distillation of the hydrocarbon oils to extract from the crude fusion product obtained in the examples above given the fluorescence forming color bodies with a hot hydrocarbon as it comes from the stills, thereby obviating separate extraction and a redissolving of the color in the hydrocarbon oil.

By the term "hydrocarbon oil" as used in this specification, we mean to include all fractions, from the lightest naphtha fractions to the heavy lubricating oils and to the crude oil itself.

We claim:

1. A process for producing hydrocarbon oils and hydrocarbon type solvents having a blue-green to orange and red fluorescence which comprises dissolving therein a color compound obtained by heating a polynuclear ketone of the class consisting of anthraquinone, benzanthrone and anthanthrone, and their methyl and halogen derivatives, with a reducing metal of the class consisting of iron, zinc, tin, nickel and lead for an extended period at temperatures above 280° C. but below 360° C. under conditions which prevent the escape of any material amount of the reaction products.

2. A process for producing hydrocarbon oils and hydrocarbon type solvents having a blue-green to yellow-green fluorescence which comprises dissolving therein a color compound obtained by heating benzanthrone with a reducing metal of the class consisting of iron, zinc, tin, nickel and lead for an extended period at temperatures above 280° C. but below 360° C. under conditions which prevent the escape of any material amount of the reaction products.

3. A process for producing hydrocarbon oils and hydrocarbon type solvents having an orange to red fluorescence which comprises dissolving therein a color compound obtained by heating anthraquinone with a reducing metal of the class consisting of iron, zinc, tin, nickel and lead for an extended period at temperatures above 280° C. but below 360° C. under conditions which prevent the escape of any material amount of the reaction products.

4. A process for producing hydrocarbon oils and hydrocarbon type solvents having an orange to red fluorescence which comprises dissolving therein a color compound obtained by heating a mixture of benzanthrone and anthraquinone with a reducing metal of the class consisting of iron, zinc, tin, nickel and lead for an extended period at temperatures above 280° C. but below 360° C. under conditions which prevent the escape of any material amount of the reaction products.

5. Hydrocarbon oils and hydrocarbon type solvents containing as an added ingredient a fluorescence exhibiting color component the product obtained by heating a polynuclear ketone of the class consisting of anthraquinone, benzanthrone and anthanthrone, and their methyl and halogen derivatives, with a reducing metal of the class consisting of iron, zinc, tin, nickel and lead for an extended period at temperatures above 280° C. but below 360° C. under conditions which prevent the escape of any material amount of the reaction products.

6. Hydrocarbon oils and hydrocarbon type solvents containing as an added ingredient a fluorescence exhibiting color component the product obtained by heating a benzanthrone with a reducing metal of the class consisting of iron, zinc, tin, nickel and lead for an extended period at temperatures above 280° C. but below 360° C. under conditions which prevent the escape of any material amount of the reaction products.

7. Hydrocarbon oils and hydrocarbon type solvents containing as an added ingredient a fluorescence exhibiting color component the product obtained by heating anthraquinone with a reducing metal of the class consisting of iron, zinc, tin, nickel and lead for an extended period at temperatures above 280° C. but below 360° C. under conditions which prevent the escape of any material amount of the reaction products.

8. Hydrocarbon oils and hydrocarbon type solvents containing as an added ingredient a fluorescence exhibiting color component the product obtained by heating a mixture of benzanthrone and anthraquinone with a reducing metal of the class consisting of iron, zinc, tin, nickel and lead for an extended period at temperatures above 280° C. but below 360° C. under conditions which prevent the escape of any material amount of the reaction products.

JOHN M. TINKER.
VIKTOR M. WEINMAYR.

CERTIFICATE OF CORRECTION.

Patent No. 2,074,288.  March 16, 1937

JOHN M. TINKER, ET AL.

It is hereby certified that error appears in the printed specification of the above numbered patent requiring correction as follows: Page 1, first column, line 36, for the word "an" read and; and second column, line 13, for "benzol-2-benzoic" read benzoyl-2-benzoic; page 2, second column, line 66, for "napththa" read naphtha; and that the said Letters Patent should be read with these corrections therein that the same may conform to the record of the case in the Patent Office.

Signed and sealed this 1st day of June, A. D. 1937.

Henry Van Arsdale
Acting Commissioner of Patents.

(Seal)